March 3, 1936. V. SPINETTE 2,032,446
AUTOMATIC CHARGING DEVICE FOR TUNNEL OVENS
Filed July 21, 1933 3 Sheets-Sheet 1

March 3, 1936. V. SPINETTE 2,032,446
AUTOMATIC CHARGING DEVICE FOR TUNNEL OVENS
Filed July 21, 1933 3 Sheets-Sheet 2

March 3, 1936.　　　　V. SPINETTE　　　　2,032,446
AUTOMATIC CHARGING DEVICE FOR TUNNEL OVENS
Filed July 21, 1933　　　3 Sheets-Sheet 3

Inventor
Victor Spinette
By B. Linger, atty.

Patented Mar. 3, 1936

2,032,446

UNITED STATES PATENT OFFICE 2,032,446

AUTOMATIC CHARGING DEVICE FOR TUNNEL OVENS

Victor Spinette, Brussels, Belgium

Application July 21, 1933, Serial No. 681,612
In Belgium July 22, 1932

8 Claims. (Cl. 107—56)

This invention relates to an automatic charging device and more particularly to an automatic charging device for putting loaves of all dimensions and small bakers' and confectioners' goods into tunnel ovens having a sealed baking chamber, either continuously or interruptedly.

In ovens of this character it is desirable to exercise great care in maintaining the baking chamber closed so as to avoid losses of heat and the possible escape of steam injected into the baking chamber.

According to the invention the necessary degree of sealing of the baking chamber is ensured during the charging of the oven by the provision of a charging carriage which is arranged to deposit a series of loaves or other goods without deformation or relative displacement thereof, into a sealed space arranged between two doors one of which is arranged to open when the other closes so that direct communication between the baking chamber and the atmosphere is avoided.

In order that the invention may be fully understood reference is directed to the accompanying drawings which illustrate diagrammatically one example of carrying the invention into effect and in which:—

Figure 6 is a detail elevation, on a larger scale, of the means for releasing the bolt to permit return movement of the carriage.

Figure 1:
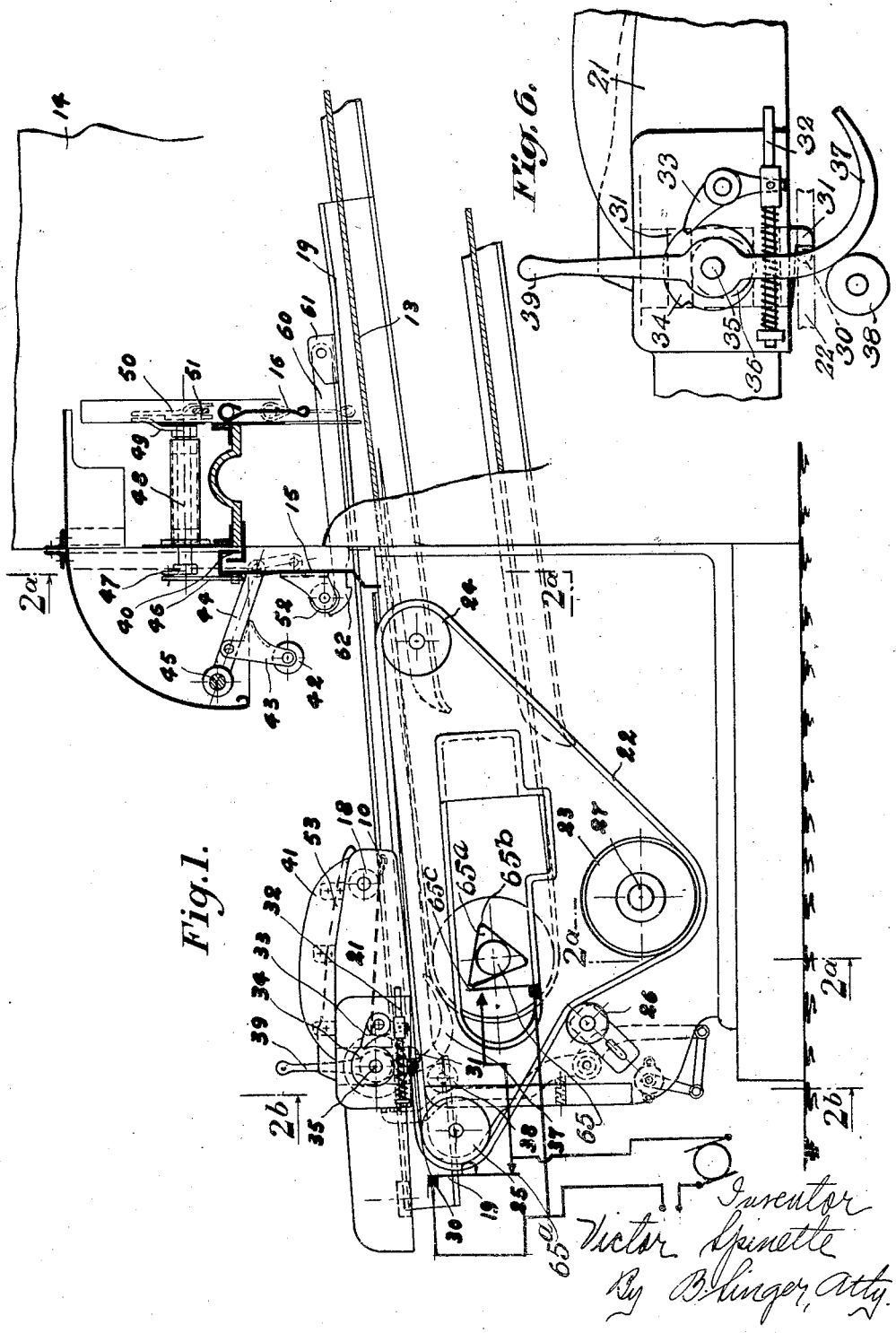
Figure 1 illustrates in sectional side elevation a charging device constructed in accordance with the invention, applied to a tunnel oven.

Referring to the drawings the charging device comprises a table 10 constituting a carriage which is covered with a fabric 11 and is adapted to receive loaves or other goods indicated at 12. The table is adapted to move backward and forward above a portion of a conveyor 13 located exteriorly of the oven 14, and to deposit the loaves on the conveyor 13 between two doors 15 and 16.

Figure 2:
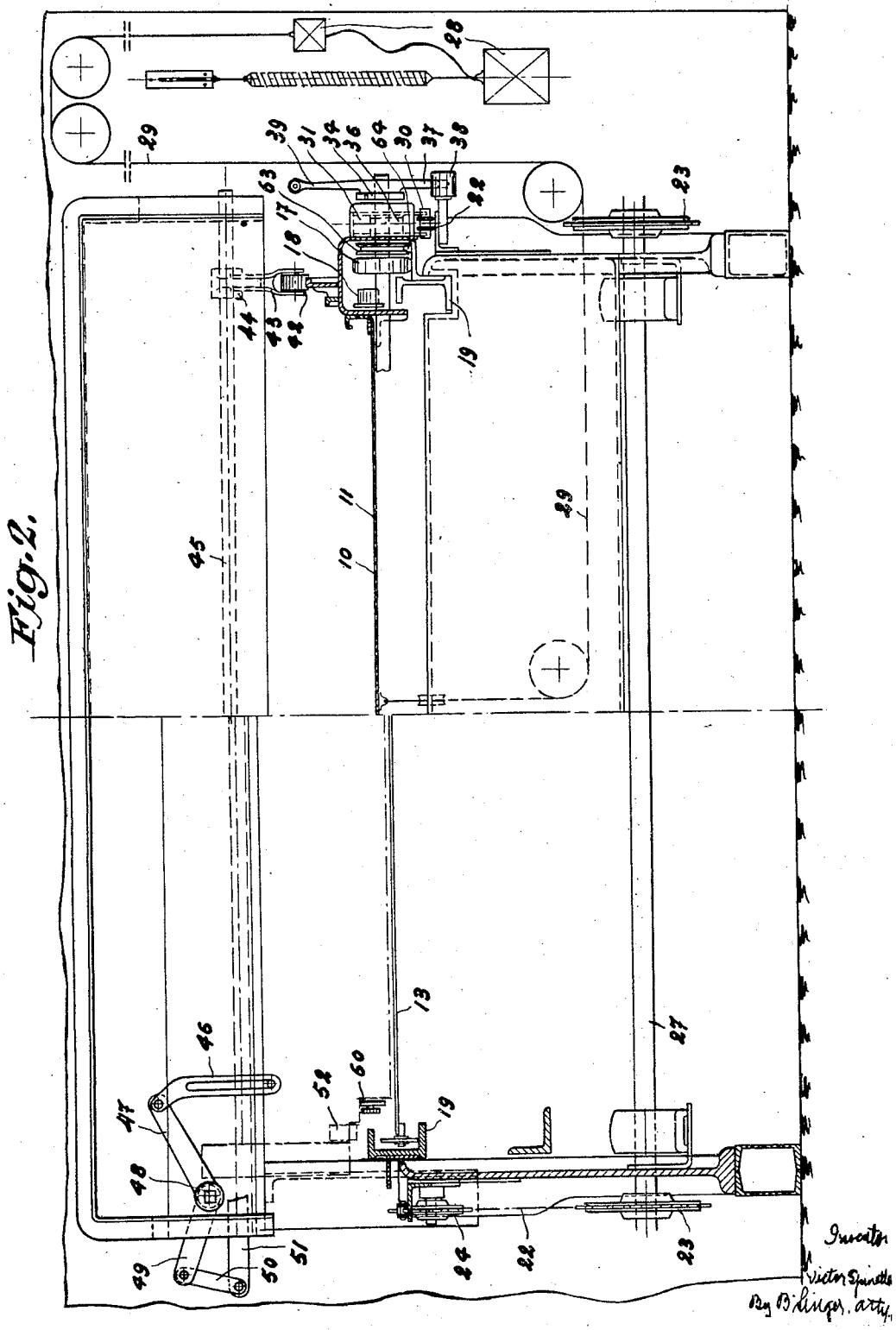
Figure 2 is a view partly in section on the line 2a—2a and partly on the line 2b—2b of Figure 1.
Figure 3:
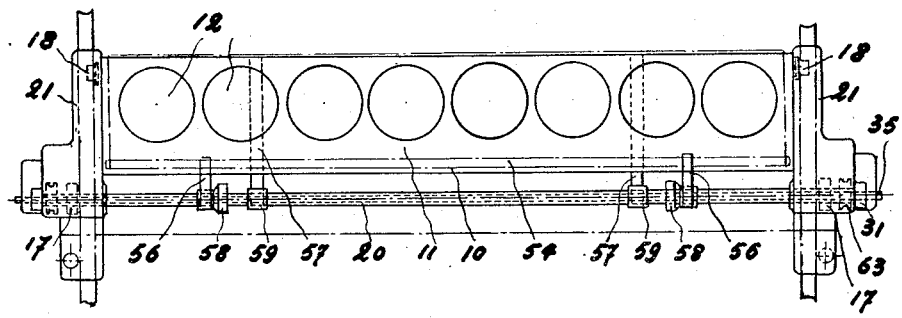
Figure 3 illustrates in plan view the charging device proper.
Figures 4, 7:
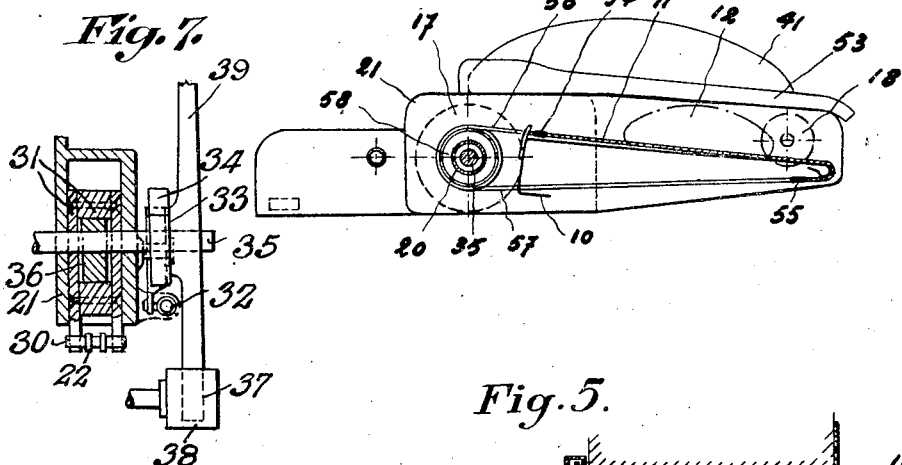
Figure 4 illustrates in cross section the charging device shown in Figure 3 but on a larger scale than the latter figure.
Fig. 7 is a transverse sectional view of the same.

The movement of the carriage is facilitated by the provision of back and front rollers 17, 18 thereon arranged to run on rails 19 supported on the frame of the oven. The rollers 17 are freely mounted on a hollow shaft 20 and the rollers 18 are mounted inside cheeks 21 of U section forming part of the charging device. During this charging movement the carriage is moved by means of endless chains 22 extending over pulleys 23, 24, 25 and a tensioning pulley 26. The pulley 23 is keyed to the shaft 27. The return movement of the charging device is effected by means of a set of counter weights 28 (Figure 2) and a cable 29, the placing of the loaves on the plate 13 being effected during the return movement of the carriage as hereinafter described.

A continuous movement is imparted to the chains 22 each of which is provided with a catch 30 formed for example, by a cylindrical element extending through one of the links of the chain and arranged to hook into a bolt 31 mounted on the external face of the corresponding cheek member 21. The carriage when loaded is thus carried by the catches 30 into the interior of the oven between the doors 15 and 16 and at the end of the travel of the carriage a sliding rod 32 carried thereby strikes against slides of the first door 15. The rod 32 is displaced inwardly against the action of the return spring, and disengages a pawl 33 from a ratchet wheel 34 carried by a shaft 35 which is fitted inside the hollow shaft 20. The wheel 34 thus liberated disengages the bolt 31 from the catch 30 under the action of a spring located in the shaft 35 and of a cam 36 keyed on the said shaft so that the carriage is permitted to turn towards its initial position under the influence of the counter weights 28 while the chains 22 continue their uninterrupted movement.

During the return movement of the carriage a pair of curved levers 37 fixed to the wheels 34 and being thus mounted on the shaft 35, strike against tappets 38 fixed on the frame of the oven. During their rotation the levers 37 cause the cams 36 to rotate so as to return the bolts 31 into their active position, the bolts being held in this position due to the re-engagement of the pawls 33 with the ratchet wheels 34 because of the rotation of the wheels 34 with the levers 37.

Should the disengagement of the bolts not be effective the carriage can still advance a certain distance, for example, approximately 28 mm. which is sufficient to enable the bolts 31 to be disengaged from the catches 30.

If for any reason the loading of the loaves under the carriage is not completed when the latter is carried along by the catches 30 on the chains 22, the bolts 31 may be disengaged from the catches by imparting a rotation of approximately a quarter of a turn to the levers 37 by means of handles 39 in a direction opposite to that of the rotation of the levers at the end of the travel of the carriage, namely towards the left in Figure 1. Thus the shaft 35 is caused to rotate against the influence of the spring which normally produces the disengagement of the bolts at the end of the travel of the carriage and thus the bolts 31 are disengaged from the catches by the action of the cams 36.

In order to ensure that the sealing of the baking chamber of the oven 14 is unimpaired, the two doors 15 and 16 are operatively connected to one another in such a manner that the door 15 which is normally closed and suspended by means of a sealing joint 40, is arranged to effect on being raised, a closing of the door 16.

When the charging device reaches the vicinity of the door 15, stops 41 carried on the cheeks 21 encounter rollers 42 carried by levers 43. The levers 43 are pivoted to levers 44 and also bear thereagainst by means of lateral extensions directed towards the door, the levers 44 being mounted at one of their extremities on a transverse shaft 45 and connected at the other extremity to the door 15 by means of links 45ᵃ. When the stops 41 encounter the rollers 42 the levers 43 and 44 are moved upwardly and carry the door 15 therewith. At the same time the door 16 is lowered through the medium of connecting rods 46, Figure 2, pivoted to the door 15 and coupled to one end of a double armed lever 47, 49 pivoted at 48 and the other end of which is coupled by a lever 50 to members 51 integral with the door 15.

This operative connection between the two doors 15, 16 ensures an extremely rapid closing of the door 16 to avoid as far as possible losses of heat and the escape of steam or vapour from the baking chamber of the oven. This connection must nevertheless be of a character which permits the two doors to be maintained open at the same time by an amount sufficient to permit the continuous charging of the oven with bread when it is not necessary to inject steam into the oven.

During the return of the carriage the levers 43 are idly deflected and the door 15 falls under its own weight, rollers 52 on the said door resting on stops 53 carried at the side of the stops 41 but at a lower level than the latter.

Another important feature of the invention consists in an automatically operating device for discharging the loaves or the like from the carriage onto the conveyor 13 of the oven. This device deposits the loaves without disturbance and consequently deformation or relative displacement thereof and comprises a cloth 11 placed on the table 10. The cloth is provided with rods 54 and 55 to which cords or straps 56 and 57 are secured which are arranged to wind respectively over drums 58 and 59 mounted on the hollow shaft 20.

Figure 5:
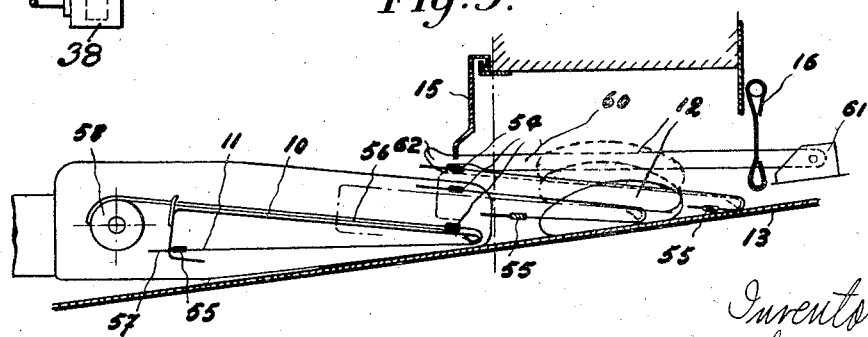
Figure 5 is a detail view showing different positions of various elements of the charging device.

Shortly before the bolts 31 of the carriage are disengaged from the catches 30, the rod 54 will become clamped by a pair of levers 60 hinged to brackets 61 on the rails 19, each lever 60 being provided at its extremity with a hook 62 into which the ends of the rod 54 automatically engage. During the first portion of the rapid return movement of the carriage the rod 54 will remain immovable and the cloth 11 passes below the carriage so as to deposit the loaves 12 on the conveyor 13 as shown in Figure 5. At the end of the movement of the cloth the rod 54 is disengaged from the hook 62 and the cloth is returned to the top of the table by means of two grooved pulleys 63 mounted on the shaft 20 the rotation of which actuates the cloth. Towards the end of the return movement of the carriage the pulleys 63 run over wedge section rails 64 so that the friction between these rails and the said pulleys effects rotation of the shaft 20 and causes the cloth 11 to be moved by virtue of winding of the cords 56 over the drums 58 on the said shaft, onto the top of the table. During the charging movement of the carriage rotation of the wheel 63 does not effect rotation of the shaft 20 and members mounted thereon because the said pulleys are operatively coupled to the shaft by a free wheel connection.

From the above description it will be seen that the charging device described will deposit the loaves or the like in successive rows and provided that the carriage is loaded at the correct intervals of time, the same distance between the rows deposited on the conveyor 13 is always maintained. This action contributes largely to the regularity of the baking of the goods due to the uniform distribution of the heat radiated by the conveyor 13 on the said goods.

Further the distances between the successive rows are arranged to be maintained at all speeds at which the goods are traversed through the oven, since the entraining shaft, or the tensioning shaft rotating with it in synchronism, of the movable conveyor of the oven may be arranged to control the starting of the starting device.

To this end the shaft 65 of the conveyor 13 is provided with a cam 65ᵃ (Fig. 1) having a suitable number of peaks 65ᵇ for example three so that during the rotation of the shaft these peaks co-operate one after the other with a switch 65ᶜ which is arranged to control the starting of the electric motor 65ᵈ driving the shaft 27 of the charging device. This motor is arranged to rotate at a constant speed sufficient to impart to the carriage a speed greater than the greatest speed of the conveyor 13. When the bolts 31 have been disengaged from the catches 30 at the end of the charging travel of the carriage the catches are arranged to meet and actuate a second switch 65ᵉ which effects the stopping of the motor, while the carriage under the action of the counter weights 28 returns to receive a fresh load. For convenience the second switch may be provided on the tensioning pulley 26 but alternatively may be arranged at any other point in the path of the chain 22. The switches, the circuits they control, and the cam 65ᵃ are indicated diagrammatically in Fig. 1. The chains will only again be set in movement when the next succeeding peak of the cam on the shaft 65 closes the first switch of the motor. The carriage will commence to be moved when the catches 30 have moved from the second switch into engagement with the bolts 31.

As the speed of the chains 22 is constant and the speed of the conveyor 13 may be varied as desired according to the nature and the size of the goods to be baked it follows that the regularity in the charging operation of the oven and consequently the duration of rest of the charging device will vary accordingly.

If it is desired to modify the distance between two successive rows of goods without altering the speed of the conveyor 13 it is sufficient to replace the cam 65ᵃ on the shaft 65 by another like cam provided with a greater or smaller number of peaks so as to produce a proportional increase or decrease of the intervals between successive charging operations.

It will be understood that the regular charging movement of the carriage must be so chosen that the duration of the periods of rest of the carriage are sufficient for the charging to be effected and that the time interval between two successive charging operations must be sufficiently great to permit the plate of the oven to move the deposited goods beyond the second door so that the latter in closing does not come into contact with the last row of goods previously placed in the oven.

What I claim and desire to secure by Letters Patent of the United States is:—

1. An automatic charging device more particularly for feeding bread into ovens having a sealed baking chamber, which comprises in combination a charging carriage mounted on rollers running on rails towards and away from the entrance of the oven, a pair of endless chains, means for moving said chains synchronously at a constant speed, catches on said chains adapted to engage bolts on the carriage to carry said carriage along said rails towards the oven, means for disengaging the bolts from the catches at a predetermined point in the path of movement of the carriage, means for depositing goods from the carriage into the oven, and a counter weight system for returning the carriage to the initial position.

2. An automatic charging device as claimed in claim 1 wherein an electric motor is provided for driving the chains of the carriage and a cam driven in synchronism with the movable conveyor of the oven is adapted to actuate a switch to control the starting of the motor and wherein a second switch for stopping the motor is adapted to be operated to stop the motor.

3. An automatic charging device as claimed in claim 1 wherein each bolt is hinged to the carriage and is controlled by a cam mounted on a transverse shaft of the carriage, the said shaft being arranged under a yielding control adapted to cause the bolt to move on its hinge to disengage it from the catch on the driving chain, the said bolt being held in its operative position by means of a ratchet wheel fixed to the said shaft, under the action of a pawl pivoted to the carriage.

4. An automatic charging device as claimed in claim 1 wherein a cloth is normally extended above a table on a carriage to receive the charge which is deposited into the oven, the said cloth having cords extended between its ends and carried over drums on a transverse shaft on the carriage, a rod being secured to each end of the cloth transversely thereof and one of which is adapted to be engaged by hooks when the carriage reaches the end of its charging movement so that upon the return movement of the carriage the rod is restrained against movement and thereby causes the cloth to be moved below the table and thereby deposits the goods in the oven, said shaft having grooved pulleys mounted thereon by means of a free wheel device such that during the latter part of the return movement of the carriage the pulleys engage frictionally on wedge-section rails and rotate the transverse shaft to bring the cloth above the table, the pulleys rotating freely on the shaft during the charging movement of the carriage.

5. An automatic charging device as claimed in claim 1, wherein an electric motor is provided for driving the chains of the carriage and an interchangeable cam driven in synchronism with the movable conveyor of the oven is adapted to actuate a switch to control the starting of the motor and wherein a second switch for stopping the motor is adapted to be operated to stop the motor.

6. An automatic charging device as claimed in claim 1, wherein each bolt is hinged to the carriage and is controlled by a cam mounted on a transverse shaft of the carriage, the said shaft being arranged under a yielding control adapted to cause the bolt to move on its hinge to disengage it from the catch on the driving chain, the said bolt being held in its operative position by means of a ratchet wheel fixed to the said shaft, under the action of a pawl pivoted to the carriage, and means for disengaging the bolts from the catches towards the end of the charging movement of the carriage, comprising a sliding rod carried by the said carriage and hinged to the pawl and adapted to be moved against the influence of a return spring by striking against a stop provided at the entrance of the oven and thereby disengage the pawl from the ratchet wheel to free the transverse shaft.

7. An automatic charging device as claimed in claim 1, wherein each bolt is hinged to the carriage and is controlled by a cam mounted on a transverse shaft of the carriage, the said shaft being arranged under a yielding control adapted to cause the bolt to move on its hinge to disengage it from the catch on the driving chain, the said bolt being held in its operative position by means of a ratchet wheel fixed to the said shaft, under the action of a pawl pivoted to the carriage, and means for disengaging the bolts from the catches towards the end of the charging movement of the carriage, comprising a sliding rod carried by the said carriage and hinged to the pawl and adapted to be moved against the influence of a return spring by striking against a stop provided at the entrance of the oven and thereby disengage the pawl from the ratchet wheel to free the transverse shaft, a curved lever fast with the ratchet wheel and adapted to cooperate towards the end of the return movement of the carriage with a tappet operable to establish engagement between the ratchet wheel and the pawl and to impart an angular movement to the transverse shaft and place the yielding control on the said shaft again under tension.

8. An oven having a lock chamber and two sliding doors provided to form movable walls of the lock chamber, the said doors being interconnected by a lever mechanism adapted to effect a rapid closing of the inner door when the outer door is open and the automatic opening of the inner door when the outer door closes and wherein means are provided for automatically opening and closing the doors during the charging operation, including a carriage to charge the lock chamber, means for moving said carriage toward and into said lock chamber and stops provided on the carriage arranged during the latter part of the charging movement of the carriage to actuate levers arranged to effect the opening of the outer door and wherein further stops are adapted to cooperate with rollers on the outer door and to control the lowering closing movement of the door under its own weight as the carriage recedes.

VICTOR SPINETTE.